United States Patent [19]

Kraft et al.

[11] 4,016,642
[45] Apr. 12, 1977

[54] METHOD OF MAKING CLUTCH HOUSING AND BEARING ASSEMBLY

[75] Inventors: Derald H. Kraft, Canton; Richard C. St. John, North Canton, both of Ohio

[73] Assignee: Aspro, Inc., Canton, Ohio

[22] Filed: Aug. 4, 1975

[21] Appl. No.: 601,346

[52] U.S. Cl. .............................. 29/509; 29/149.5 R; 29/520; 308/196
[51] Int. Cl.[2] ................... B21D 39/00; B23P 11/00
[58] Field of Search ............ 29/509, 510, 511, 520, 29/149.5 R, 159, 445; 308/196

[56] References Cited

UNITED STATES PATENTS

| | | | |
|---|---|---|---|
| 3,121,944 | 2/1964 | Karau | 29/520 X |
| 3,268,984 | 8/1966 | Kupchick | 29/511 UX |
| 3,318,645 | 5/1967 | Sutowski | 29/520 UX |
| 3,339,270 | 9/1967 | Walton et al. | 29/511 |

Primary Examiner—Charlie T. Moon
Attorney, Agent, or Firm—Frease & Bishop

[57] ABSTRACT

A method of making a dynamically balanced integral clutch housing and bearing assembly from a flat sheet metal disc by a roller spinning tool. A bearing and the metal disc is mounted on rotating die means between headstock and tailstock die form assemblies of a spinning machine. The spinning tool presses the disc against an end of the bearing to provide a bottom web wall of a cup-shaped bearing housing. The spinning tool then moves in a series of passes along the bearing outer race and along the headstock die form thereby rolling, forming and ironing rotating outer metal portions of the disc against the bearing and die, and forming an annular circumferential flange wall of the bearing housing which terminates in an annular shoulder. The bearing is telescopically mounted and retained within the bearing housing by the side and web walls and retaining shoulder. The spinning tool continues to pressure work outer portions of the metal disc and forms a larger cup-shaped clutch housing extending from and integrally connected to the annular retaining shoulder. A pulley then is secured to the bearing housing side wall by roller spinning metal from the side wall to form a pair of annular bead formations locking the pulley in position.

The clutch housing and bearing assembly produced has a cup-shaped bearing housing with a cylindrical side wall terminating in an end web wall and an annular retaining shoulder. A bearing is telescopically mounted within the bearing housing and retained therein by the side wall, web wall and annular shoulder. A larger cup-shaped clutch housing has a cup wall integrally connected to the annular shoulder of the bearing housing, with the cup wall terminating in an annular flange adapted to be engaged by friction shoes of a clutch mechanism.

12 Claims, 20 Drawing Figures

FIG.3

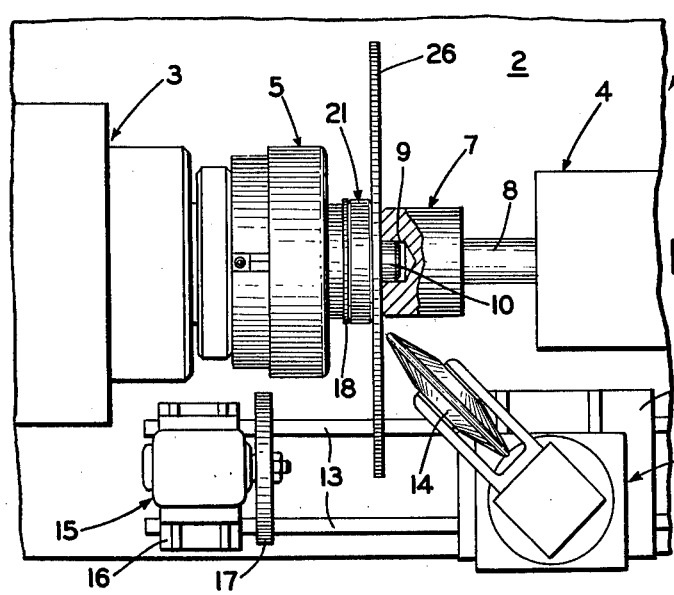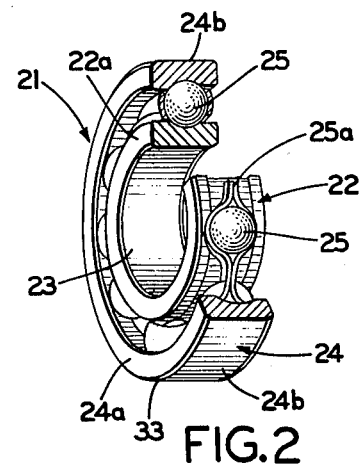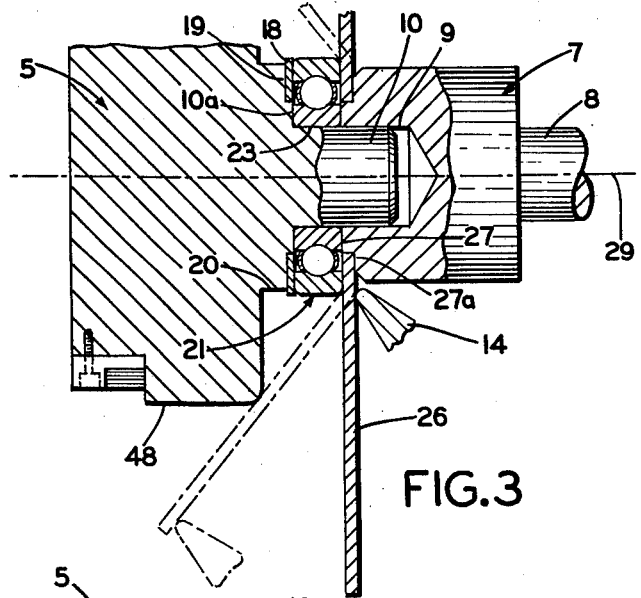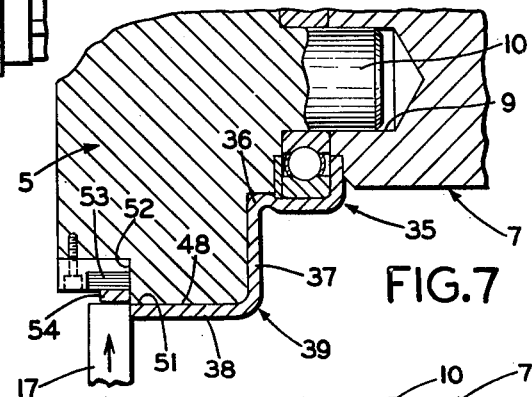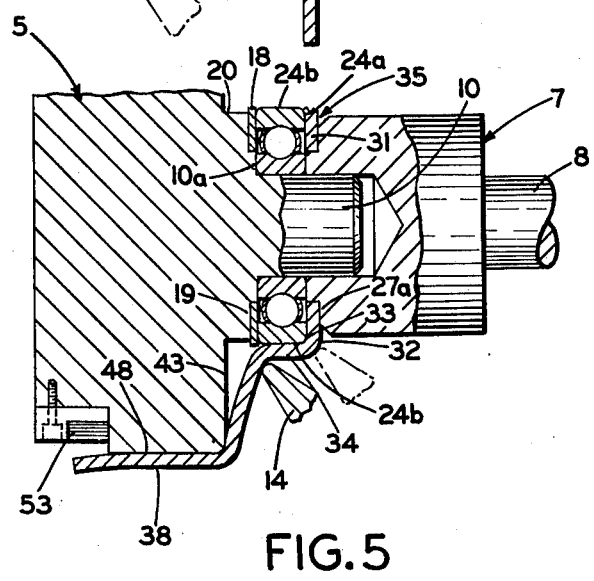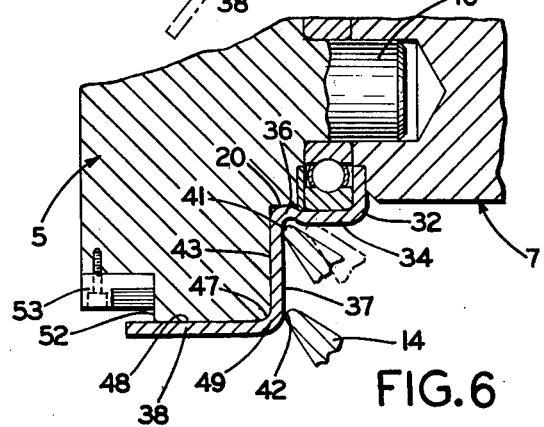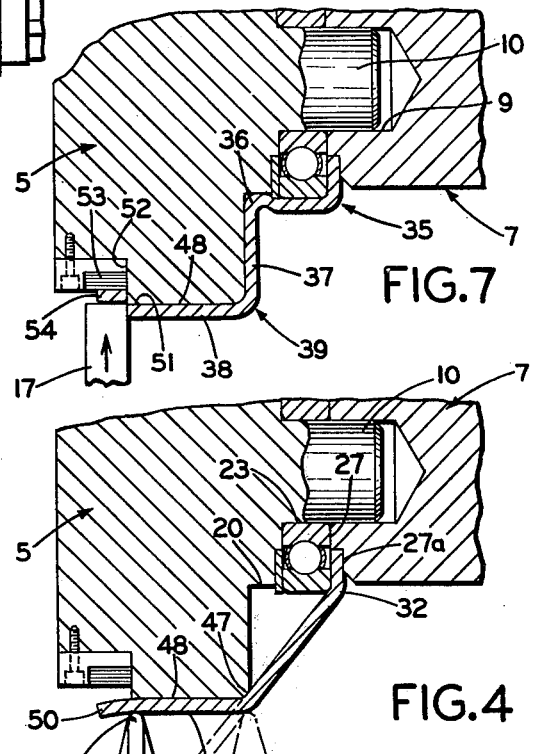

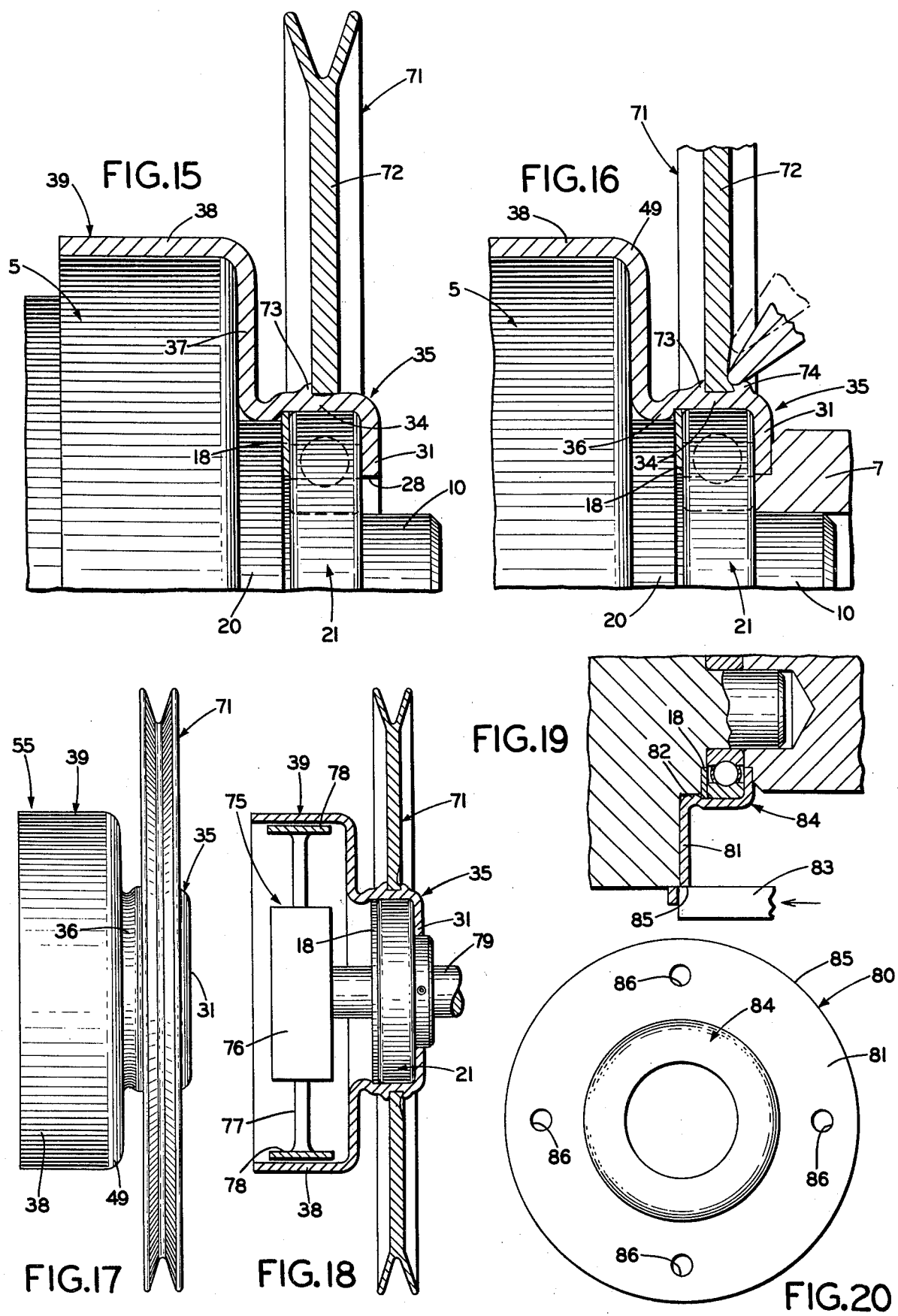

METHOD OF MAKING CLUTCH HOUSING AND BEARING ASSEMBLY

BACKGROUND OF THE INVENTION

1. Field of the Invention

The invention relates to a clutch housing and bearing assembly and to the method of manufacturing such an assembly. More particularly, the invention relates to the construction of a dynamically balanced cup-shaped clutch housing having an integral smaller cup-shaped bearing housing with a bearing retained within the bearing housing, and to the method of roller spinning such a clutch housing and bearing assembly from a flat sheet metal disc, in which the bearing housing is roller spun over the bearing during spin forming of the clutch housing.

2. Description of the Prior Art

Many procedures have been used and are known for the formation of clutch housings having a bearing retained in a hub portion thereof for rotatably mounting the clutch housing on a driving shaft of a clutch mechanism. Many of these procedures involve stamping and drawing operations to produce a cup-shaped clutch housing blank on which a bearing is mounted in an end wall portion thereof. Finished clutch housing and bearing assemblies which are produced by such prior stamping and drawing methods are not balanced dynamically since the cup-shaped blanks are formed by a series of progressive die steps on a non-rotating blank. Other procedures and apparatus, however, have been known for directly spinning cup-shaped housing blanks from flat sheet metal discs for producing dynamically balanced clutch housings.

Considerable expense and time consuming operations are required to mount the bearing on the cup-shaped housing blanks, whether the housing blanks are produced by stamping and drawing, or spinning operations. Heretofore, a cylindrical bearing retaining ring was brazed or welded within a complementary central opening in the end wall of the clutch housing, which retaining ring has one or more snap-ring grooves formed therein. Such retaining rings are expensive due to the machining and close tolerances required in their manufacture for receiving and holding a bearing. Likewise, after securing the retaining ring to the cup-shaped housing end wall, the bearing or bearings then are snap fitted into the grooves of the retaining ring, again requiring a separate manufacturing procedure, increasing the final cost.

A V-grooved pulley then is mounted on the extended end of the bearing retaining ring adjacent the end wall of the clutch housing by brazing or welding procedures. Again, such procedures are time consuming and require additional welding or brazing equipment for attaching the pulley, thereby inreasing still further the cost of the final clutch housing and pulley construction.

The clutch housing and bearing assemblies produced by these prior known procedures thus, consist of a clutch housing having a separate relatively expensive bearing retaining ring component welded or brazed thereto, which in turn receives a separate bearing element. These bearing assemblies may or may not include end sealing rings or discs to retain lubricant within the bearing, and to prevent dust and dirt from accummulating therein.

Insofar as we are aware, no clutch housing and bearing assembly has been known in the art having an integrally formed clutch housing with a preferably cylindrical side wall or rim flange portion which is adapted to be engaged by the clutch shoes of a clutch mechanism, in combination with a smaller cup-shaped bearing housing formed integrally with the rim flange portion of the clutch housing and in which a bearing is mounted and retained within the bearing housing without requiring additional components as heretofore required. Furthermore, no known method of which we are aware enables the production of such clutch housing and bearing assemblies by roller spinning, in which a bearing housing is roller spun over the bearing followed by the subsequent spinning of a larger cup-shaped clutch housing from a flat sheet metal disc on simple types of metal spinning machines, which assemblies are dynamically balanced due to the complete formation by roller spinning on rotating dies; and in which a pulley also can be attached to the bearing housing by roller spinning procedures performed on the same spinning machine eliminating heretofore required welding and brazing operations and equipment.

SUMMARY OF THE INVENTION

Objectives of the invention include providing a new method and procedure for the manufacture from a simple sheet metal disc blank, a dynamically balanced sheet metal clutch housing and bearing assembly having a cup-shaped bearing housing with an axially extending side wall and integrally connected annular shoulder and end web wall, and in which a bearing is retained axially within the housing by the annular shoulder and end wall; providing such a procedure which enables the clutch housing and bearing assemblies to be produced on relatively inexpensive and simple lathe-type metal spinning machines with a minimum of tooling costs, requiring basically a headstock die form having an outer configuration complementary to the internal shape of the axially extending side wall and annular shoulder of the clutch and bearing housings, and a pressure forming roller for laying the metal of a flat disc blank against the headstock die form and over a bearing placed on a pilot pin of the headstock die during a series of passes of the roller with respect to the die form; providing such a procedure which requires only replacing the headstock die form on the spinning machine to make various sizes and configurations of generally cup-shaped clutch housings which enables rapid and inexpensive changeover to produce such different clutch housings and bearing assemblies; providing such a procedure in which a plurality of bearings may be mounted within the clutch housing during the roller spinning formation thereof together with retaining washers or seals to enable the use of lubricated bearings; providing such a new procedure and method in which a pulley can be mounted on the hub portion of the bearing housing by spinning procedures eliminating heretofore required welding and brazing operations; providing such a procedure which preferably may be automatically program controlled enabling an unskilled workman to operate a plurality of such metal clutch housing spinning machines for carrying out the steps of the improved method; and providing a new procedure and method for making such dynamically balanced clutch housing and bearing assemblies in which the bearings are installed within a bearing housing during the spinning procedure, which procedure eliminates difficulties heretofore encountered, achieves the various objectives indicated in a practical, workable and easily controlled and inexpensive manner, and which solves and satisfies needs which have long existed in the art.

Further objectives of the invention include providing a clutch housing and bearing assembly having a cup-shaped clutch housing with an open ended axially extending side wall or rim portion which is adapted to be engaged by friction shoes of a clutch mechanism, in which a smaller cup-shaped bearing housing is integrally connected with the clutch housing side wall by an annular shoulder, which bearing housing includes a circumferential flange wall integrally connected at one end to the annular shoulder and formed with an integrally connected end web wall at the other end, and in which one or more bearings are retained within the circumferential wall of the bearing housing by the annular shoulder and end web wall; providing such an assembly in which the integrally connected clutch housing and bearing assemblies are roller spun from a single flat sheet metal disc including those portions of the bearing housing which mount and retain the bearing within the housing thereby eliminating additional components which heretofore were welded or brazed on the clutch housing to form the bearing retaining and mounting means; providing such an assembly in which retaining washers may be mounted adjacent the bearing to assist in retaining the bearing within the circumferential wall of the bearing housing and to provide sealing means for lubricated-type bearings; providing such an assembly in which a pulley may be mounted on the circumferential wall of the bearing housing without welding or brazing procedures; and providing such an assembly which may be produced inexpensively, simply, conveniently, efficiently, and with a high degree of quality control and uniformity, and which assembly is dynamically balanced.

These objectives and advantages are obtained by the improved method of making a clutch housing and bearing assembly, the general nature of which may be stated as including, the steps of assembling side by side bearing means and a flat sheet metal disc having a central hole formed therein; clamping the assembled bearing means and disc at a central portion of the disc around the disc hole between relatively axially movable and rotatable headstock and tailstock die means; rotating the die means and disc bearing means clamped by the die means; pressure rolling, forming and ironing rotating annular disc metal portions surrounding the clamped central portion against portions of the bearing means to form a bearing housing partially annularly surrounding the bearing means and securing the bearing means within the bearing housing; continuing the pressure rolling, forming and ironing of the rotating annular disc portions beyond the bearing housing against flange forming means provided on the headstock die means to form a larger cup-shaped clutch housing having an annular clutch shoe engaging flange terminating in an open end; and then while continuing rotation of the die means, trimming the open end of said flange to a predetermined length.

These objectives and advantages are obtained further by the new clutch housing and bearing assembly, the general nature of which may be stated as including; a cup-shaped bearing housing having a circumferential flange with an inturned web wall at one flange end and an annular retaining shoulder at the other flange end; bearing means telescopically mounted within the housing flange and clamped axially between the web wall and retaining shoulder; a larger cup-shaped clutch housing having a cup wall terminating in an annular flange; and said clutch housing cup wall being integrally connected with the bearing housing at the retaining shoulder.

BRIEF DESCRIPTION OF THE DRAWINGS

The preferred embodiment of the improved construction and method steps for the manufacture thereof — illustrative of the best mode in which applicant has contemplated applying the principles — are illustrated in the drawings, and set forth in the following description, and are particularly and distinctly pointed out and set forth in the appended claims.

FIG. 1 is a fragmentary diagrammatic top plan view of portions of a type of simple spinning machine which may be used to carry out certain steps of the new procedure;

FIG. 2 is a fragmentary perspective view of one type of bearing which may be mounted within the clutch housing and bearing assembly;

FIG. 3 is a somewhat diagrammatic fragmentary sectional view of a bearing unit and a flat sheet metal disc blank mounted between headstock and tailstock dies of the spinning machine shown in FIG. 1, and showing the formation of the flat bottom wall of the bearing housing portion of the clutch housing assembly;

FIg. 4 is a view similar to FIG. 3 showing the step of the spinning operation in which an outer annular portion of the blank disc is laid along an outer surface of the headstock die to form a cylindrically shaped terminal flange on the clutch housing;

FIG. 5 is a view similar to FIGS. 3 and 4 showing a step of the improved roller spinning operation in which an intermediate annular portion of the blank disc is laid along the bearing outer race to form a cylindrical wall of the bearing housing, and preparatory to forming an annular retaining shoulder for retaining the bearing within the bearing housing;

FIG. 6 is a view similar to FIGS. 3–5 showing the steps of completing the formation of the annular retaining shoulder of the bearing housing and of a bottom wall of the clutch housing;

FIG. 7 is a view similar to FIGS. 3–6 showing a trimming operation being performed on an extended open end of the completed clutch housing and bearing assembly;

FIG. 15 is a view similar to FIG. 13 showing another type of V-grooved pulley mounted on the bearing housing preparatory to securing the same thereon by roller spinning;

FIG. 16 is a view similar to FIG. 14 showing the securing of the V-grooved pulley of FIG. 15 to the bearing housing by roller spinning a retaining bead from the metal of the pulley wall;

FIG. 17 is a reduced side elevational view of the clutch housing and bearing assembly having a V-grooved pulley mounted thereon as shown in FIGS. 14 and 16;

FIG. 18 is a diagrammatic sectional view of the clutch housing and bearing assembly and pulley of FIG. 17, in combination with a type of centrifugal clutch to be used therewith;

FIG. 19 is a view similar to FIG. 7 showing a modified bearing assembly being roller spun by steps of the new procedure; and FIG. 20 is an end elevational view of the bearing assembly produced by the steps of FIG. 19.

Similar numerals refer to similar parts throughout the drawings.

Figure 8:
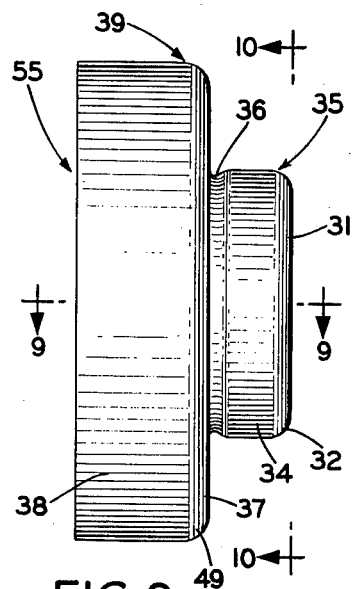
FIG. 8 is a side elevational view of the dynamically balanced, roller spun, clutch housing and bearing assembly formed from a flat metal disc by the roller spinning steps shown in FIGS. 3–7.

DESCRIPTION OF THE PREFERRED STEPS OF THE METHOD TO PRODUCE A CLUTCH HOUSING AND BEARING CONSTRUCTION

A portion of a typical simple lathe type spinning machine for carrying out the steps of the improved roller forming method is shown in FIG. 1 and is indicated generally at 1. Spinner 1 includes a bed 2, a headstock assembly 3 and a tailstock assembly 4. A headstock die form 5 is mounted on headstock assembly 3 and is rotated by a motor driven shaft (not shown).

Tailstock assembly 4 preferably has a die form 7 axially movable by a piston rod 8. An aperture 9 is formed in tailstock die 7 for receiving a pilot pin 10 formed on and extending axially outwardly from the center of the headstock die 5 (FIG. 3).

A tool holder 11 is movably mounted on a cross feed carriage 12 which in turn is movably mounted on a pair of guide rods 13 for longitudinal axial movement between headstock 3 and tailstock 4. A pressure spinning roller 14 is rotatably mounted on tool holder 11 and is movable in both parallel and transverse directions with respect to the longitudinal axis of the spinning machine 1 by manipulation along cross feed carriage 12 and guide rods 13.

A metal trimming wheel assembly 15 is mounted on second cross feed carriage 16 which in turn is mounted on guide rods 13. Assembly 15 includes a wheel 17 for trimming the edge portions of the cup-shaped clutch housing produced in accordance with the procedures set forth below. Trimming assembly 15 may be of the type shown in U.S. Pat. No. 2,702,597.

The particular construction and arrangement of machine 1 and the components thereof, may be modified and changed without effecting the concept of the invention. The important feature brought out by the construction of machine 1 shown in FIG. 1 is the relative simplicity thereof in contrast with the known complex prior art spinning machines used for a variety of spinning procedures.

Figure 9:
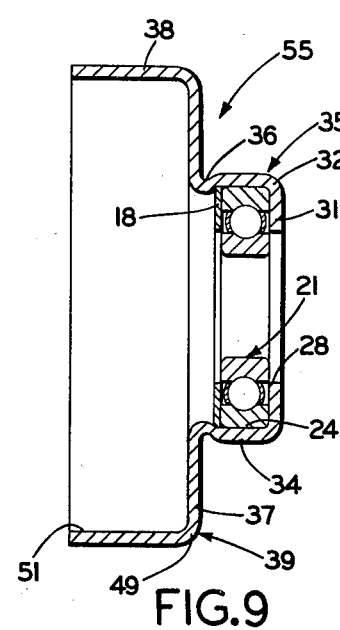
FIG. 9 is a sectional view of the clutch housing and bearing assembly taken on line 9—9, of FIG. 8.
Figure 10:
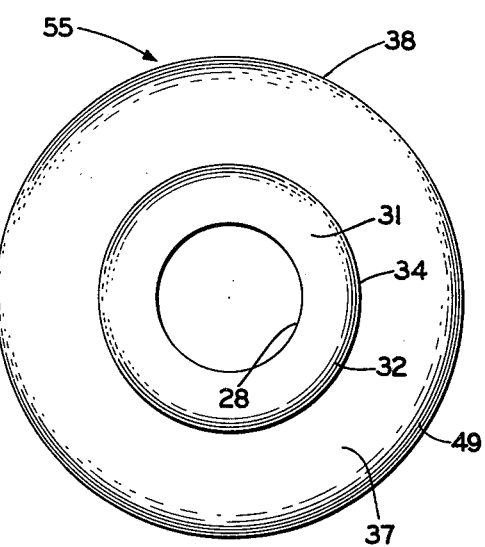
FIG. 10 is an end elevational view looking in the direction of arrows 10—10, FIG. 8.
Figure 14:
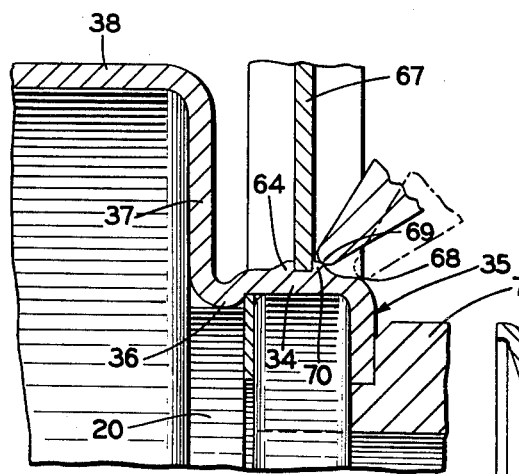
FIG. 14 is a view similar to FIG. 13 showing the V-groove pulley being secured to the bearing housing by roller spinning a second annular bead of metal from the bearing housing side wall.

The improved roller spinning procedure is set forth diagrammatically in FIGS. 3-7 with the clutch housing and bearing construction produced thereby being shown in FIGS. 8-10 and being shown in FIGS. 14 and 16 with a V-grooved pulley mounted thereon.

A retaining washer 18 (FIG. 3) preferably is mounted on an offset shoulder 10a of pilot pin 10 and abuts a flat circular end face 19 of headstock die 5. The diameter of washer 18 is slightly larger than the diameter of end face 19 so that washer 18 projects beyond an annular shoulder forming wall 20 of headstock die 5. A bearing indicated generally at 21, then is mounted on pilot pin 10 of headstock die form 5 and abuts washer 18 and shoulder 10a. Bearing 21 may be of the type shown in FIG. 2 having a generally cylindrical inner race 22 forming a central bearing opening 23, and a complementary cylindrical outer race 24 with a plurality of balls 25 mounted therebetween within a retaining ring 25a.

A flat sheet metal disc blank 26 is clamped between bearing 21 and an annular portion 27a of end face 27 of tailstock die 7 by actuating of a hydraulic cylinder or the like controlling piston rod 8. Pilot pin 10 projects through a central hole 28 formed in disc 26 as well as through the center of washer 18 and bearing opening 23, and into aperture 9 of tailstock die 7 to properly align and center disc 26, bearing 21 and washer 18 on headstock die 5 of spinning machine 1 (FIG. 3).

The forming tool or roller 14 is guided into contact with the central portion of rotating blank disc 26 which is adjacent to and surrounding tailstock die 7 (FIG. 3) by the concurrent movement of cross carriage 12 and tool holder 11 until pressure is exerted on disc 26. Roller 14 then moves in a transversely, radially outwardly extending direction with respect to the longitudinal axis 29 of machine 1, forcing the annular portion of disc 26 surrounding the clamped central portion against the outer periphery of flat outer end faces 22a and 24a of bearing races 22 and 24, respectively. Sufficient pressure is exerted by roller 14 on disc 26 during this outward radial movement to iron out any indentation gauge variation or other irregularity of disc 26 without materially reducing the original metal thickness of disc 26. The clamping force of tailstock 7 and spinning action of roller 14 forms a flat bottom web wall 31 of a generally cup-shaped bearing housing 35 of the clutch housing and bearing construction being produced by the steps of the improved spinning procedure.

Carriage 12 then moves longitudinally along guide rods 13 forwardly towards headstock die 5 simultaneously with the radial outward movement of tool holder 11, causing roller 14 to follow a generally diagonal path laying down the outer disc portions diagonally with respect to headstock die 5 as shown in dot-dash lines, FIG. 3. Roller 14 returns to the dot-dash line position adjacent headstock die 5 as shown in FIG. 4. Roller 14 then moves generally longitudinally rearwardly to the full-line position 46 of FIG. 4 forming and laying down the outermost annular portion of disc 26 against a cylindrical flange forming wall 48 of die 5. This metal working forms a cylindrical terminal flange wall 38 of cup-shaped clutch housing, indicated generally at 39 (FIG. 7). The outermost end portion of disc 26 will curve outwardly as shown in FIG. 4 during the spinning and working of the metal since it is unrestrained in the axial and outer radial directions.

Roller 14 then returns to the dot-dash position adjacent tailstock die 7, FIG. 5. Roller 14 works and forms an outer annular portion of disc 26 which surrounds the flat bottom web wall 31 against the annular outer surface 24b of outer race 24. This roller working forms a generally right angled corner 32 and a cylindrical or circumferential wall 34 against complementary corner 33 and outer surface 24b of outer race 24. Web wall 31 and integrally connected cylindrical side wall 34 together form the cup-shaped bearing housing 35 for telescopically receiving and mounting bearing 21.

The next series of operations or steps of the improved process forms an annular retaining shoulder 36, and outer flange walls which form a generally cup-shaped clutch housing integrally connected with the bearing housing 35. Roller 14 moves generally simultaneously inwardly and rearwardly in a series of passes from its dot-dash line position of FIG. 6 to full line position 41, and then radially outwardly to a second full line position 42.

Roller 14 forms, irons and presses a portion of the metal of disc 26 behind the extended peripheral edge of washer 18 and against annular die shoulder 20 to form the annular retaining shoulder 36. The radial outward movement of roller 14 forms and irons an annular portion of the disc metal beyond bearing housing 35 against a radially extending cup forming wall 43 of die 5 forming a radially extending cup flange wall 37 of a cup-shaped clutch housing, indicated generally at 39. Roller 14 then lays down an annular portion of disc 26 against a right-angled die corner 47 adjacent cylindrical flange forming wall 48 of die 5 to integrally connect cylindrical cup terminal flange wall 38 of clutch housing 39 to the radial cup-forming flange wall 37 by a right-angled corner 49. Die end face 19 projects axially beyond radial die wall 43 by the length of annular die shoulder 20, and is shown parallel to and concentric with die wall 43 and of a smaller diameter.

The clutch housing 39 produced by the steps of FIGS. 3-6 need not have the generally cylindrical cup-shaped configuration shown, including radially extending flange wall 37 and cylindrical flange wall 38. These flange walls which form the clutch housing can have various shapes without departing from the concept of the invention. For example, flange wall 37 may have a conical shape extending between annular shoulder 36 and cylindrical flange wall 38; likewise, cylindrical flange wall 38 can have various shapes to conform to the configuration of clutch friction shoes with which wall 38 is adapted to engage when in a completed clutch assembly. Also flange walls 37 and 38 may be replaced by a single flange wall of various shapes which extend integrally from bearing housing 35, which wall both supports bearing housing 35 and provides the clutch shoe enaging surface.

The next step of the improved method involves the trimming of the extended somewhat irregular end 50 of a terminal flange wall 38 which forms a cup end opening 51, to a predetermined axial length by moving trimming wheel 17 of trim assembly 15 radially inwardly on cross feed carriage 16, as shown diagrammatically in FIG. 7. Die 5 preferably has an annular shoulder 52 formed adjacent the end of cylindrical wall 48 with one or more trim blades 53 mounted thereon. Wheel 17 trims an annular ring end section 54 from cylindrical wall 38 which is subsequently cut into pieces by blades 53 in a somewhat similar manner as described in U.S. Pat. No. 2,702,597.

The dynamically balanced cup-shaped clutch housing and bearing assembly, indicated generally at 55 (FIGS. 8, 9 and 10) which is roller spun in accordance with the steps of the improved method, comprises integrally connected bearing housing 35 and clutch housing 39. Bearing housing 35 is formed by flat end web wall 31 having an opening 28 provided therein, and cylindrically shaped circumferential flange wall 34 terminating in annular retaining shoulder 36. Clutch housing 39 includes radially extending cup flange wall 37 which is integrally connected to annular shoulder 36, and which terminates in cylindrical flange wall 38 which forms open end 51 of assembly 55.

In accordance with the invention, bearing 21 is formed as a part of clutch housing and bearing assembly 55 and secured within bearing housing 35 without any welding, brazing or other manufacturing procedures being required. Bearing 21 becomes, in a sense, an integral portion of the clutch housing and bearing assembly 55 during the formation of clutch housing 39 and bearing housing 35 by roller spinning from a single disc shaped metal blank 26. Washer 18 need not be mounted within bearing housing 35 between annular shoulder 36 and bearing 21 to achieve the desired results of the invention. Annular shoulder 36 can be formed directly about outer race corner 33 and against annular die shoulder 20 if desired. Washer 18 or a similar disc-like member preferably is used to provide a seal to retain lubrication within the bearing and to prevent dirt and debris from entering the bearing.

Bearing 21 is held secure within bearing housing 35 by circumferential wall 34 preventing rotational movement of outer race 24 with respect thereto. Likewise, bearing 21 is prevented from axial movement with bearing housing 35 by bottom web wall 31 and annular shoulder 36.

Figure 11:
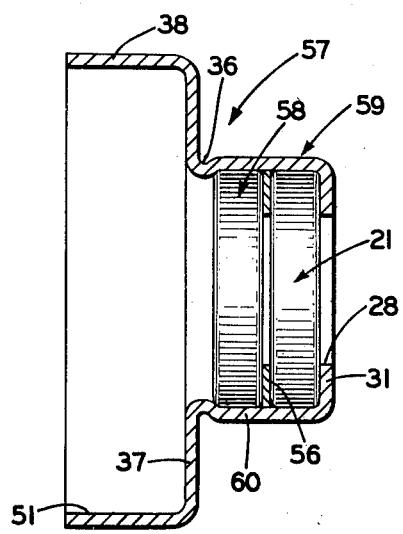
FIG. 11 is a sectional view similar to FIG. 9, of a modified form of the clutch housing and bearing assembly, in which a pair of bearings is mounted within a spun bearing housing.

A modified form of the clutch housing and bearing assembly of the invention is shown in FIG. 11, and is indicated generally at 57. Assembly 57 is similar to assembly 55 of FIGS. 8-10 except for the inclusion of a second bearing 58 within an elongated bearing housing 59. A washer-like spacer 56 preferably is placed between bearing 21 and second bearing 58.

Modified clutch housing and bearing assembly 57 is roller spun in accordance with the steps of the method shown in FIGS. 3-7. The only difference between modified assembly 57 and assembly 55 is the formation of a longer axially extending circumferential wall 60 of bearing housing 59, required to partially enclose the additional bearing 58 and spacer 56. A washer (not shown) similar to washer 18 may be used between second bearing 58 and annual retaining shoulder 36 if desired.

Another feature of the invention is the method steps for securing a V-grooved pulley on the cylindrical wall of the bearing housing by roller spinning. Heretofore, a pulley was attached to a clutch housing or a bearing mounting ring by welding or brazing requiring a completely separate and distinct manufacturing procedure and related equipment.

Figure 12:
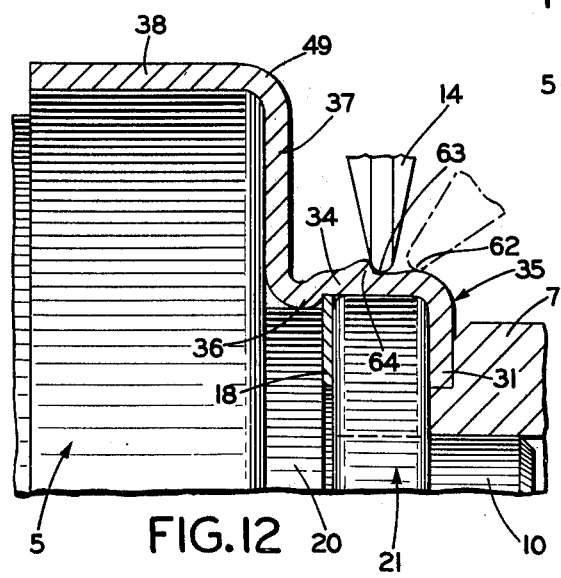
FIG. 12 is a somewhat diagrammatic enlarged fragmentary sectional view showing the roller spinning of an annular retaining bead on the bearing housing side wall preparatory to mounting a V-grooved pulley on the bearing housing.

In accordance with the invention, after the spin forming of clutch housing and bearing assembly 55, roller 14 is brought into contact with the intermediate portion of bearing wall 34, as indicated by dot-dash line position 62 (FIG. 12). Roller 14 then moves slightly radially inwardly and axially towards radial flange wall 37 to full line position 63, reforming a portion of the metal in bearing cup wall 34 into an annular bead-like formation 64 as assembly 55 is rotated in clamped position with headstock and tailstock dies 5 and 7.

Figure 13:
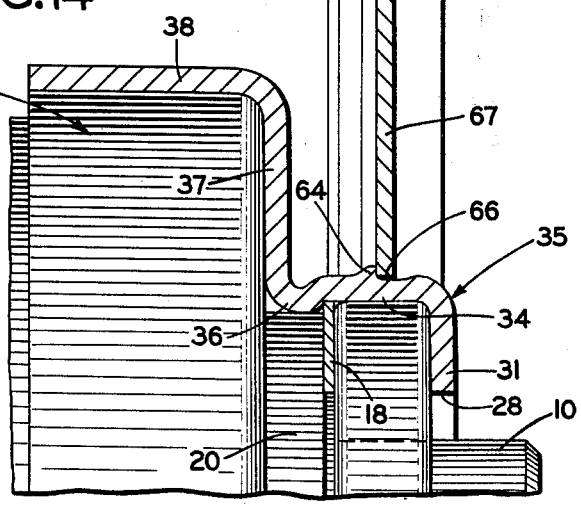
FIG. 13 is a view similar to FIG. 12 showing a V-grooved pulley mounted on the bearing housing prior to securing the pulley thereto by roller spinning.

A pulley 65 next is placed or journaled on wall 34 of bearing housing 35 as shown in FIG. 13. Pulley 65 has a central circular opening 66 formed in a flat central wall 67, with opening 66 having a diameter complementary to the outer diameter of side wall 34. Tailstock die 7 is retracted temporarily from its clamping position to permit pulley 65 to be placed on side wall 34, and then die 7 is returned to its clamping position prior to rotating the clamped assembly.

Roller 14 then moves from dot-dash position 68 (FIG. 14) to full line position 69 reforming metal from an end portion of rotating side wall 34 into a second annular bead-like formation 70. The spinning roller formation of bead 70 clamps pulley wall 67 tightly against the first annular bead 64 and effectively bonds pulley wall 67 with beads 64 and 70 and bearing housing side wall 34 rigidly securing pulley 65 on bearing housing 35.

FIGS. 15 and 16 illustrate a modification of the method steps of attaching a pulley to the completed clutch housing and bearing assembly shown in FIGS. 12–14. A pulley 71 (FIG. 15) having a relatively thick central wall 72 is placed on bearing housing side wall 34 adjacent a first bead-like formation 73 formed similarly to bead 64 as shown in FIG. 12. Roller 14 then moves radially inwardly along pulley wall 72 reforming a portion of the metal from wall 72 downwardly into a second annular bead-like formation against bearing housing wall 34. The roller spinning of bead 74 and the pressure exerted by roller 14 fuses or bonds the metal of bead 74 with side wall 34, rigidly securing and clamping pulley 71 on side wall 34 between beads 73 and 74.

The steps and procedures of FIGS. 12–16 enable a pulley to be firmly mounted on the clutch housing and bearing assemblies of the invention by roller spinning with the existing equipment in which the assembly is formed without removal of the assembly from the spinning machine. The rotation of the spinning machine need only be stoped momentarily to permit a pulley to be placed on bearing housing side wall 34 after retraction of tailstock die 7. Likewise, no additional metal or material is required for attaching the pulley to the assembly, with the metal being obtained from side wall 34 and/or pulley wall 72.

FIG. 17 illustrates the improved clutch housing and bearing assembly 55 produced by the steps of the invention, in combination with a V-grooved pulley 71 mounted on and firmly attached to bearing housing 35 by the steps of FIGS. 12–16. This completed combination is accomplished by metal spinning procedures on a simple lathe-type spinning machine without requiring any welding or brazing procedures, and from a flat sheet metal disc blank without requiring machined components for mounting a bearing on the assembly.

The combination clutch housing and bearing assembly 55 and V-grooved pulley is shown diagrammatically in FIG. 18 incorporated into a clutch mechanism 75 illustrating a use for assembly 55. Clutch mechanism 75 includes a main clutch body 76 with a plurality of centrifugally actuated shoes 77 having friction material 78 mounted on the extended ends for engagement with annular terminal flange wall 38 of clutch housing 55. Clutch body 76 is mounted on a driving shaft 79 which extends through opening 23 of bearing 21.

A further modified form of the method steps and article produced thereby is shown in FIGS. 19 and 20. A modified bearing assembly 80 is roller spun in accordance with the steps of the method shown in FIGS. 3–7. The main difference between assemblies 55, 57 and 90 is the elimination of cylindrical wall 38. An annular radially extending flange 81, similar to cup flange wall 37, is roller spun integral with an annular bearing retaining shoulder 82.

A trim assembly (not shown) is slidably mounted on guide rods 13 for longitudinal movement adjacent headstock die form 5. The trim assembly includes a trimming wheel 83 which trims the extended end of radial flange 81 to a predetermined radial length with respect to bearing housing 84 and forms a circumferential edge 85 on flange 81.

Modified bearing assembly 80 then is provided with a plurality of holes 86 (FIG. 20) in radial flange 81 through which bolts may be inserted for mounting bearing assembly 80 on a piece of machinery or equipment for receiving a shaft within the bearing opening 23. This modified assembly need not limit the article produced by the steps of the new procedure to clutch mechanisms but produces a bearing assembly which can be adapted for use in numerous constructions wherein a bearing is used.

A washer 18, and a pair of bearing-spacer combinations can be installed within bearing housing 84 of bearing assembly 80 in the same manner as described above and shown in FIG. 11 without affecting the concept of the invention.

Accordingly, the present invention provides substantial improvements in the art of making clutch housing and bearing assemblies of the type having a bearing mounted on the clutch housing for rotatably mounting the clutch housing on a driving shaft of a clutch mechanism; provides for the manufacture of a statically and dynamically balanced concentric sheet metal clutch housing and bearing assembly having a cup-shaped clutch housing and an integrally connected smaller cup-shaped bearing housing in which one or more bearings is mounted and retained by an annular retaining shoulder and web wall which are integral portions of the clutch housing; and provides a method and an assembly produced thereby which satisfy the various objectives set forth, which solve problems and satisfy demands existing in the art, and which obtain the new results indicated.

In the foregoing description, certain terms have been used for brevity, clearness and understanding but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved clutch housing and bearing assembly spin forming procedure is carried out, the characteristics of the new clutch housing and bearing assembly, the characteristics of the new concept, and the advantageous, new and useful results obtained; the new and useful constructions, methods, steps and procedures are set forth in the appended claims.

We claim:

1. The method of making a clutch housing and bearing assembly including the steps of a. assembling side by side bearing means and a flat sheet metal disc having a central hole formed therein;

b. clamping the assembled bearing means and disc at a central portion of the disc around the disc hole between relatively axially movable and rotatable headstock and tailstock die means;

c. rotating the die means, and the disc and bearing means clamped by the die means;

d. pressure rolling, forming and ironing rotating annular disc metal portions surrounding the clamped central portion against portions of the bearing means to form a bearing housing which at least partially surrounds the bearing means, and to form retaining means which secures the bearing means within the bearing housing;

e. continuing the pressure rolling, forming and ironing of the rotating annular disc portions beyond the bearing housing against flange forming means provided on the headstock die means to form a cup-shaped clutch housing having an annular clutch shoe engaging flange terminating in an open end; and f. then while continuing rotation of the die means, trimming the open end of said clutch housing flange to a predetermined length.

2. The method defined in claim 1 including the step of forming an annular retaining shoulder which integrally connects the bearing housing to the cup-shaped clutch housing, against flange forming shoulder means provided on the headstock die means, prior to the clutch-housing-pressure rolling, forming and ironing step, to form the retaining means for the bearing means.

3. The method defined in claim 2 including the step of forming against radially extending flange means provided on the headstock die means, an annular radially extending flange on the cup-shaped clutch housing integrally connecting the retaining shoulder of the bearing housing to the annular clutch shoe engaging flange of the clutch housing during the continued pressure rolling, forming and ironing of the metal disc portions beyond the bearing housing.

4. The method defined in claim 3 including the step of forming against axially extending flange means provided on the headstock die means, an annular axially extending clutch shoe engaging flange terminating in the open end and integrally connected to the annular radial flange of the clutch housing during the continued pressure rolling, forming and ironing of the metal disc portions to form the annular clutch shoe engaging flange.

5. The method defined in claim 4 in which the trimming step trims the open end of the annular axially extending clutch shoe engaging flange to provide a predetermined axial length of the clutch shoe engaging flange from the radial cup-wall flange of the clutch housing.

6. The method defined in claim 1 including the steps of assembling a washer at one side and the disc at the other side of the bearing means during the assembling of the bearing means and metal disc, and partially surrounding the washer and securing the washer within the bearing housing during the formation of the bearing means retaining means.

7. The method defined in claim 1 including the steps during the initial pressure rolling, of a. pressure rolling, forming and ironing rotating annular disc metal portions surrounding the clamped central portion against radially extending end portions of the headstock die means to form an end web wall of the bearing housing;

b. continuing the pressure rolling, forming and ironing of the rotating annular disc portions beyond the web wall against an outer race of the bearing means to form an axially extending circumferential flange of the bearing housing integral with the web wall; and then c. pressure rolling, forming and ironing the rotating annular disc portions beyond the circumferential flange against annular shoulder forming means provided on the headstock die means to form an annular retaining shoulder on the bearing housing integral with the circumferential flange and extending inwardly with respect to said circumferential flange.

8. The method as defined in claim 1 including the additional steps of a. reforming a portion of the metal of the bearing housing by pressure roll working said metal portion to form a first annular bead on the bearing housing;

b. placing a pulley having a central wall and an opening formed therein on the bearing housing adjacent to the first annular bead; and c. reforming a second portion of the metal of the bearing housing by pressure roll working said second metal portion to form a second annular bead and clamping the pulley central wall between the first and second annular beads securing the pulley on the bearing housing.

9. The method defined in claim 1 including the additional steps of a. reforming a portion of the metal of the bearing housing by pressure roll working said metal portion to form a first annular bead on the bearing housing;

b. placing a pulley having a central wall and an opening formed therein on the bearing housing adjacent to the first annular bead; and c. reforming a portion of the metal of the central wall of the pulley surrounding the central opening to form a second annular bead on the bearing housing and securing the pulley on the bearing housing between said first and second annular beads.

10. The method of making a bearing assembly including the steps of a. assembling side by side bearing means and a flat sheet metal disc having a central hole formed therein;

b. clamping the assembled bearing means and disc at a central portion of the disc around the disc hole between relatively axially movable and rotatable headstock and tailstock die means;

c. rotating the die means, and the disc and bearing means clamped by the die means;

d. pressure rolling, forming and ironing rotating annular disc metal portions surrounding the clamped central portion against portions of the bearing means to form a bearing housing which at least partially surrounds the bearing means, and to form retaining means which secures the bearing means within the bearing housing;

e. continuing the pressure rolling, forming and ironing of the rotating annular disc portions beyond the bearing housing against radial flange forming means provided on the headstock die means to form an annular radially extending flange terminating in a circumferential end; and
f. then while continuing rotation of the die means, trimming the circumferential end of said radial flange to a predetermined radial length with respect to the bearing housing.

11. The method defined in claim 10 including the step of forming an annular retaining shoulder which integrally connects the bearing housing to the radially extending flange, against flange forming shoulder means provided on the headstock die means, prior to the radial flange-pressure rolling, forming and ironing step, to form the retaining means for the bearing means.

12. The method defined in claim 10 including the steps of assembling a washer at one side and the disc at the other side of the bearing means during the assembly of the bearing means and metal disc, and partially surrounding the washer and securing the washer within the bearing housing during the formation of the bearing means retaining means.

* * * * *

UNITED STATES PATENT AND TRADEMARK OFFICE
CERTIFICATE OF CORRECTION

PATENT NO. : 4,016,642
DATED : April 12, 1977
INVENTOR(S) : Derald H. Kraft and Richard C. St. John It is certified that error appears in the above-identified patent and that said Letters Patent are hereby corrected as shown below:

Column 1, line 56, change "inreasing" to --increasing--;

Column 3, line 2, add the word --problems-- after the word "solves";

Column 4, line 28, change the word "FIg." to --FIG.--;

Column 6, line 23, change "actuating" to --actuation--;

Column 6, line 61, add the word --cup-- after the word "cylindrical";

Column 7, line 53, change "enaging" to --engaging--;

Column 10, line 2, change "90" to --80--; and

Column 12, line 20, delete the word "as" after "method".

Signed and Sealed this

Fourteenth Day of June 1977

[SEAL]

Attest:

RUTH C. MASON
Attesting Officer

C. MARSHALL DANN
Commissioner of Patents and Trademarks